Figure 1:
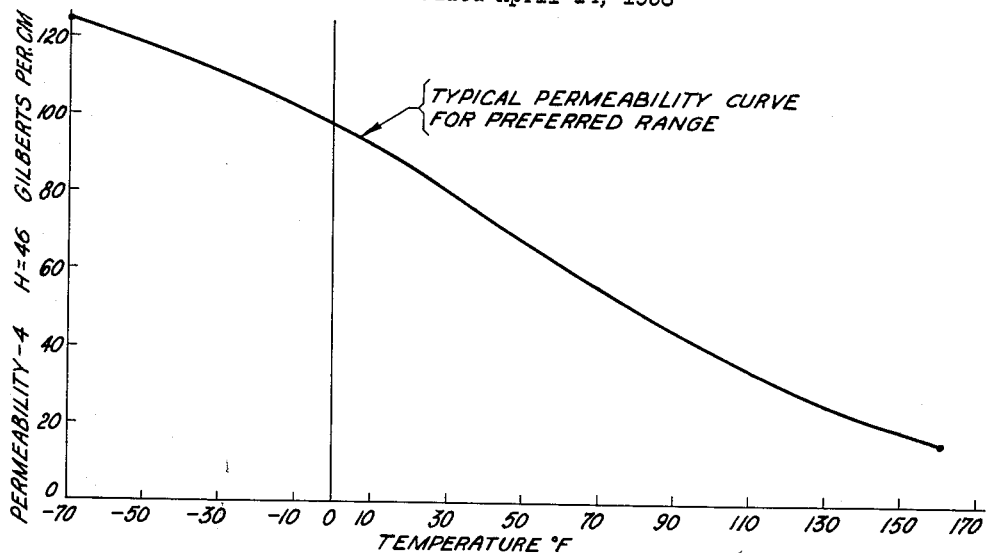

March 14, 1961 R. H. MITCHEL ET AL 2,975,339
MAGNETIC ALLOY
Filed April 14, 1958

INVENTORS
Ralph H. Mitchel &
Raymond E. Schwyn
BY
ATTORNEY

United States Patent Office 2,975,339
Patented Mar. 14, 1961

2,975,339

MAGNETIC ALLOY

Ralph H. Mitchel and Raymond E. Schwyn, Flint, Mich., assignors to General Motors Corporation, Detroit, Mich., a corporation of Delaware Filed Apr. 14, 1958, Ser. No. 728,188

6 Claims. (Cl. 317—158)

This invention relates to an alloy and particularly to a temperature responsive magnetic alloy for making indicating instruments such as magnetic speedometers almost completely independent of variations in temperature over an unusually wide range of temperatures.

Magnetic measuring instruments, such as a typical vehicle speedometer, generally are of a type which comprises a stationary field plate with which is positioned a magnet adapted to be driven directly or indirectly from a shaft whose rotational speed is to be measured, and a drag element positioned in the magnetic field between the magnet and the field plate and adapted to be displaced from its position of rest a distance proportional to the speed of rotation of the shaft.

Such an instrument provides quite accurate indications when operated at the temperature at which it is calibrated, but if it is operated at temperatures appreciably above or below this temperature, the speed indications will be considerably in error. This error is caused by the fact that while the strength of the magnetic field between the poles of the magnet and the field plate remains substantially constant within the range of temperatures to be considered, the electrical resistance of the materials of which the drag element is made increases very considerably with increases in temperature and decreases proportionally with decreases in temperature. As is well known, the strength of the eddy currents induced in the drag element by the moving lines of force between the magnet and the field plate varies inversely with these variations of resistance and temperature. Consequently, inasmuch as the deflection of the drag element from its position of rest depends on the strength of the eddy currents flowing therein (the strength of the magnetic field remaining constant), the speed indications given thereby will be high at temperatures below and low at temperatures above that at which the instrument is calibrated.

It is obvious that indications of an instrument of the type described will be unaffected by temperature changes if neither the electrical resistance of the drag element nor the strength of the magnetic field passing through the drag element varies with changes in temperature. Since, as hereinbefore stated, the strength of the magnetic field passing through the drag element is practically constant throughout the temperature range to be considered, this condition will be fulfilled by forming the drag element of the material or combination of materials having the temperature coefficient of electrical resistance approaching zero. Such materials exist, but their electrical resistances are so high as to make their use in an instrument of this type impractical.

Accordingly, it has been a common expedient to make the drag element of a material having a low electrical resistance with the accompanying relatively high temperature coefficient of electrical resistance. The indications of such an instrument will be unaffected by temperature changes if the magnetic field passing through the drag element thereof is caused to vary in such a manner as to compensate for the changes in resistance of the drag element. This, of course, means that the strength of the magnetic field passing through the drag element must vary directly with the resistance of the drag element. Several means of accomplishing this have been proposed.

If a piece of magnetic material having a negative temperature coefficient of magnetic permeability is positioned in the instrument so as to shunt a portion of the magnetic field of the magnet away from the drag element, an increase in temperature will cause less of the flux from the magnet to flow into the shunt and more to flow through the drag element. Similarly, as the temperature decreases, more of the magnetic flux will flow into the shunt and less through the drag element. The use of such a shunt, therefore, will tend to compensate the instrument for temperature changes. Such devices are shown in the United States patents to Wedin 1,848,068 and Davey 1,848,057.

Several magnetic materials having appreciable negative temperature coefficients of permeability are shown, among which are certain alloys of nickel and copper and certain alloys of nickel and iron. However, heretofore only one alloy has been known which has proved to be entirely satisfactory, having a sufficient uniformity in its corrective influence when the instrument of which it forms a part has been subjected to a very wide range of temperatures. This alloy is disclosed in our prior United States Patent 2,668,944 to Schwyn et al.

Until recently, operating temperatures for automotive speedometers normally have been considered to range from 0° F. to 100° F., with a total error in the readings of 4 miles per hour at a speed of 60 miles per hour for example being permissible. To meet such a moderate standard, the alloys heretofore used have been generally satisfactory. However, many types of modern motor vehicles, particularly those which are used for military purposes, are required to be equipped to operate under extreme temperature conditions, such as those encountered in Arctic and tropical climates. Accordingly, these requirements necessitate the use of speedometers which are compensated to register speed with a maximum error of 5% over a temperature range of minus 65° F. to plus 160° F., for example. When an instrument of the type described above is subjected to these temperature conditions, its accuracy becomes totally inadequate, the temperature error in many instances commonly being as great as 30 miles per hour over this wide temperature range.

Moreover, many of the temperature compensator alloys previously used undergo permanent changes in permeability upon exposure to low temperatures, resulting in substantial errors in the instrument readings. It definitely has been shown by photomicrographic and X-ray analysis that these permanent permeability changes are due to a phase change from gamma to alpha in the alloys.

In the past, two alloys also have been combined in magnetic measuring instruments, these alloys acting together having a resultant compensation effect which renders the readings fairly accurate at most operating temperatures. However, not only are such "double compensators" more expensive than single alloy compensators, but they likewise heretofore have become inaccurate by undergoing permanent changes in permeability because of the aforementioned phase change at extremely low temperatures.

As shown in our previous United States Patent No. 2,668,944, satisfactory single alloy compensators can be formed using a suitable nickel-iron alloy containing 0.3% to 2.9% by weight chromium. Although an alloy having this proportion of chromium is generally satisfactory for single alloy compensators we have now unexpectedly found that a nickel-iron alloy containing a specific proportion of manganese is also suitable as a single compensator material.

A principal object of this invention therefore is to provide a nickel-iron alloy which contains a specific proportion of manganese to impart characteristics to the alloy which make it suitable as a single compensator material. Such an alloy can be used alone in magnetic measuring instruments without resorting to additional alloys to greatly reduce errors in readings due to temperature changes of an extremely wide range of temperatures. The use of such an alloy permits simpler construction than that necessary in a double compensator type of instrument thereby substantially reducing manufacturing and assembly costs.

A further object of this invention is to provide a temperature compensator alloy which may be incorporated into a magnetic measuring instrument wherein the alloy comprises a combination of elements which shift the phase boundary between the gamma and alpha phases out of the operating temperature range of the instrument and in which the compensator is stabilized to temperatures as low as minus 110° F.

Figure 2:
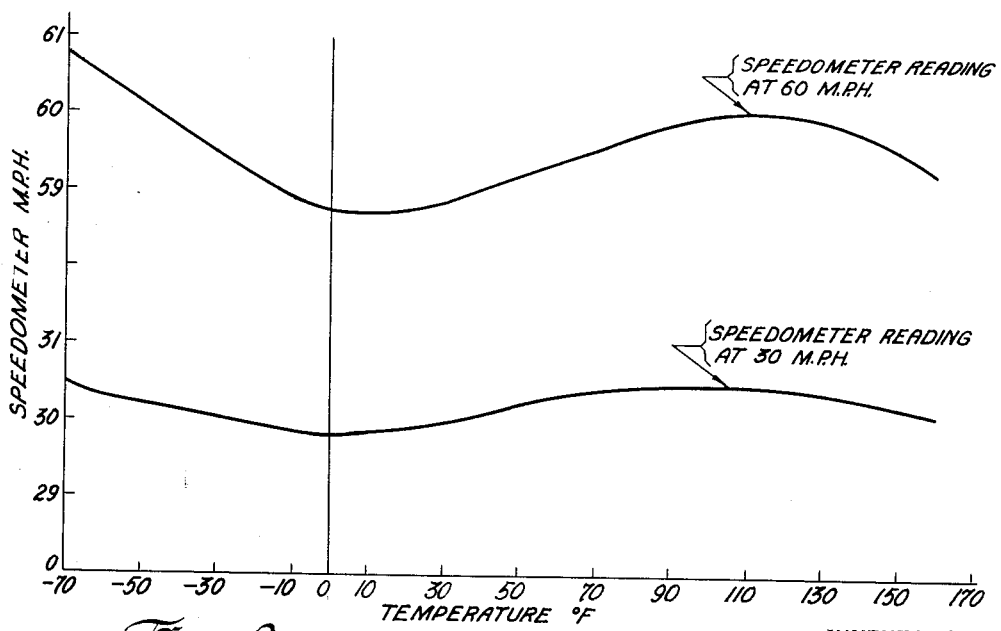

Other objects, features and advantages of our invention will more fully appear from the following description taken in conjunction with the accompanying drawing, in which:

Figure 1 is a graph showing a temperature-permeability curve over a very wide range of temperatures of a temperature compensator formed from an alloy in accordance with our invention; and Figure 2 is a graph showing curves in which actual speeds are compared with speedometer readings at various temperatures.

The objects are attained in accordance with the present invention by the use of a temperature compensator formed from an alloy containing major proportions of nickel and iron with a minor proportion of manganese wherein optimum properties are obtained when small amounts of chromium and silicon are also included in the alloy. More specifically, we have obtained excellent results with an alloy which comprises 29.25% to 31.25% nickel, 1.0% to 2.4% manganese, less than 0.3% chromium and less than 0.5% silicon, all proportions by weight, and the balance substantially all iron.

Various incidental impurities such as sulfur and phosphorus may also be present in the usual small amounts without any appreciable detrimental effects. Generally, however, neither phosphorus nor sulfur should be present in quantities greater than 0.1% by weight for best results. We have also found that inasmuch as cobalt functions in a manner generally similar to that of the nickel when present in small amounts, if desired cobalt not in excess of approximately 3% by weight may be included in the alloy as a substitute for an equal amount of nickel. For best results, as stated in our United States Patent No. 2,668,944, the cobalt content should not exceed 0.1%, the approximate quantity in which it is normally present in commercially obtained nickel. Accordingly, the alloy which we prefer to use and which presents the best combination of properties for use as a temperature compensator comprises 30.50% to 31.00% nickel, 1.0% to 1.5% manganese and maximum of 0.01% chromium, 0.2% silicon and 0.15% carbon, all proportions by weight, with the balance substantially all iron. This preferred composition provides a suitable temperature-permeability curve over an extremely wide temperature range.

In this alloy the nickel content is very important inasmuch as raising the proportion of nickel increases the permeability and slope of the temperature-permeability curve as well as raising the temperature above which the permeability of the alloy remains constant with increases in temperature, this point commonly being known as the Curie point. Since small variations in the nickel content in this alloy result in greater differences in the temperature-responsive characteristics, it is important that the percentages be maintained within the specific limits. If the nickel content is raised above approximately 31.25%, the alloy has too high a permeability and too steep a curve for practical purposes. To insure the necessary permeability, on the other hand, the nickel content should not be below 29.25%. Moreover, if the nickel content is less than this amount, the Curie point of the alloy is at too low a temperature, thus precluding the possibility of having the desired straight temperature-permeability curve within the operating temperature range. Below a percentage somewhat less than 29.25%, the alloy becomes very inefficient, and with percentages not much below this minimum limit the alloy has a magnetic transformation point within the operating range of minus 110° F. to plus 170° F., particularly if the manganese content is lower than the aforementioned minimum amount.

Increasing the nickel content increases the permeability and gamma phase of the alloy while lowering its phase change temperature and decreasing the nickel content increases the amount of the alloy in the alpha phase. Therefore, if the amount of nickel is decreased below approximately 29.25%, the phase change temperature is raised to too great an extent resulting in poor low temperature stability.

It has now been found that small amounts of manganese in the alloy improves its low temperature stability by shifting the aforementioned phase boundary and increasing the proportion of the alloy in the gamma phase. Proportions of manganese, when used alone in the alloy in amounts as low as 1.0% by weight, have been found to produce a satisfactory change in the phase boundary. The presence of a sufficient proportion of manganese in a nickel-iron alloy can be used to preclude a magnetic transformation therein over a fairly wide range of temperature. It has now been found that increasing amounts of manganese also lower the Curie point and the temperature-permeability curve of the alloy. Further, amounts of manganese over the aforementioned maximum impart an irregular rate of permeability change to the alloy over a wide temperature range, making it unsuitable for use as a single compensator material. In general, a satisfactory temperature-permeability curve is obtained if the manganese content is maintained below 2.4% by weight.

The presence of chromium also affects the Curie point of the alloy, increasing the chromium content resulting in shifting the Curie point toward the lower temperatures. Therefore, as hereinbefore stated, to obtain best results the alloy should not contain more than approximately 0.01% chromium, although satisfactory results may be had with a chromium content almost up to about 0.3%. The addition of chromium also appears to have the effect of decreasing both the permeability and slope of the temperature-permeability curve.

Silicon does not appreciably affect the permeability of the alloy nor the slope of the temperature-permeability curve if maintained below approximately 0.5%. However, the presence of this element in quantities as low as 0.05%, in combination with the manganese, aids in providing the alloy with low-temperature stability. Especially satisfactory results are obtained if the silicon content is maintained below 0.2%.

The presence of carbon in amounts up to 0.5% has only a relatively small effect on the Curie temperature and serves to provide low-temperature stability in lowering the phase boundary of the alloy to some extent. When present in greater amounts the carbon tends to distort the temperature-permeability curve of the alloy and a preferred curve is obtained when the carbon does not exceed about 0.15%.

If cobalt is substituted for a portion of the nickel, its presence raises the Curie temperature and increases the permeability of the alloy and also increases the amount of the alloy in the gamma phase. Since these effects are substantially similar to those obtained with nickel, the latter may be replaced by cobalt in amounts as large as 3%. If cobalt is added in excessive amounts, however, the shape of the temperature permeability curve of the alloy becomes unsatisfactory, and the optimum shape of this curve is usually obtained when the cobalt content is not greater than 0.1%.

We have thus provided a temperature compensator alloy which is adapted to be attached to a rotating magnet and positioned within the magnet field of a measuring instrument. Thus used, this alloy constitutes a shunt which permits the reduced electrical resistance of a speed cup, which tends to cause the readings to be too high at low temperature, to be compensated by the increased permeability of the compensator alloy. At temperatures above those for which the instrument is calibrated, on the other hand, the reverse is true, the reduced permeability of the compensator permitting more of the flux to pass through the speed cup to counteract the increased resistance of the latter. Hence, the temperature compensator directly controls the proportion of the magnetic flux which passes through the speed cup to thereby provide maximum accuracy of speed indication over an exceptionally wide range of temperatures.

The efficiency of the above-described temperature compensator alloy can be seen from the curve shown in Figure 1. In this graph, temperatures ranging from minus 70° F. to plus 160° F. are plotted on the abscissa of the curve, while the ordinate represents the magnetic permeability of the compensator when subjected to a magnetic field of constant strength, the particular curve shown resulting when the field intensity is 46 gilberts per centimeter. From this graph it can be seen that our alloy produces a temperature-permeability curve which is generally a straight line through the wide temperature range from minus 70° F. all the way to plus 160° F. and results in instrument readings which are unusually accurate over this range. Although this alloy is designed to meet certain requirements hereinbefore mentioned, including those stemming from military considerations, its temperature-permeability curve actually is an approximate straight line down to a temperature as low as minus 110° F.

The effectiveness of the present invention in stabilizing a magnetic measuring instrument against changes in temperature is shown in Figure 2. The graph shows the deviation in true speed from speedometer readings at both high and low speeds over a wide range of temperature. Under a constant true speed the speedometer reading is plotted against temperature showing that the actual speeds, indicated by the curves, vary insignificantly from the speedometer readings. Not only does the speedometer reading vary only slightly from the true speed at higher speeds, such as shown by the 60 miles per hour curve, but this is also true at the lower speeds as indicated by the 30 miles per hour curve. In fact, it will be noted that over the temperature range from a minus 50° F. to a plus 160° F. the deviation of the 60 miles per hour curve from the true speed is generally less than one mile per hour. The 30 miles per hour curve shows that a speedometer using the present invention is even more accurate at lower speeds over a wide temperature range, the maximum deviation in the speedometer reading from the actual speed being generally less than one-half mile per hour. Thus, it will be seen that this invention provides a temperature compensator alloy which may be incorporated into a magnetic instrument to reduce errors due to temperature changes to less than 2% when the instrument is subjected to all temperatures which might possibly be encountered.

It is to be understood that although our invention has been described in connection with certain specific examples thereof no limitation is intended thereby except as defined in the appended claims.

We claim:

1. A temperature responsive magnetic alloy having a magnetic permeability which decreases with increases in temperature, said alloy comprising by weight about 29.25% to 31.25% nickel, about 1% to 2.4% manganese, less than about 0.5% silicon, less than about 0.3% chromium and the balance substantially iron.

2. A temperature responsive magnetic alloy having a magnetic permeability which decreases with increases in temperature, said alloy comprising by weight 30.5% to 31.0% nickel, about 1% to 2.4% manganese, about 0.05% to 0.5% silicon, less than 0.3% chromium and the balance substantially iron.

3. A temperature compensator for a magnetic measuring instrument formed from an alloy having a magnetic permeability which decreases with increases in temperature, said alloy comprising by weight about 29.25% to 31.25% nickel, about 1% to 2.4% manganese, about 0.05% to 0.5% silicon, less than 0.3% chromium and the balance substantially iron.

4. A temperature responsive compensator for magnetic instruments, said compensator being formed from an alloy comprising by weight about 30.5% to 31.0% nickel, about 1% to 1.5% manganese, about 0.05% to 0.2% silicon, less than about 0.1% chromium and the balance substantially iron.

5. A temperature responsive magnetic alloy having a magnetic permeability which decreases with increases in temperature, said alloy comprising by weight about 29.25% to 31.25% nickel plus cobalt, about 1% to 2.4% manganese, less than about 0.5% silicon, less than about 0.3% chromium and the balance substantially iron, the cobalt content not to exceed approximately 3%.

6. In a magnetic measuring instrument a temperature responsive compensator for correcting errors due to temperature changes, said compensator being formed from an alloy having the following composition by weight: 30.5% to 31.0% nickel, 1% to 1.5% manganese, 0.05% to 0.2% silicon, 0.01% chromium maximum, 0.1% cobalt maximum, 0.15% carbon maximum, 0.1% phosphorus maximum, 0.1% sulfur maximum and the balance substantially iron.

References Cited in the file of this patent

UNITED STATES PATENTS 2,668,944    Schwyn et al. _____ Feb. 9, 1954